(12) United States Patent
Hewitt et al.

(10) Patent No.: US 6,725,760 B1
(45) Date of Patent: Apr. 27, 2004

(54) BRAKE BOOSTER

(75) Inventors: Wayne A. Hewitt, Laporte, IN (US); Joseph M. Whicker, Elkhart, IN (US)

(73) Assignee: Robert Bosch Corporation, Broadview, IL (US)

( * ) Notice: Subject to any disclaimer, the term of this patent is extended or adjusted under 35 U.S.C. 154(b) by 58 days.

(21) Appl. No.: 10/144,323

(22) Filed: May 13, 2002

(51) Int. Cl.[7] .................................................. F15B 9/10
(52) U.S. Cl. ......................... 91/369.2; 92/99; 91/376 R
(58) Field of Search ..................... 92/99, 100; 91/369.1, 91/369.2, 376 R

(56) References Cited

U.S. PATENT DOCUMENTS

| | | | | |
|---|---|---|---|---|
| 3,279,327 A | * | 10/1966 | French | 91/376 R |
| 3,958,497 A | * | 5/1976 | Gardner et al. | 92/99 |
| 4,738,186 A | * | 4/1988 | Rossigno et al. | 91/376 R |
| 5,062,348 A | * | 11/1991 | Gotoh et al. | 91/376 R |
| 5,207,142 A | * | 5/1993 | Hewitt | 91/376 R |
| 5,320,024 A | * | 6/1994 | Wagner et al. | 91/376 R |

* cited by examiner

Primary Examiner—Thomas E. Lazo
(74) Attorney, Agent, or Firm—Leo H. McCormick, Jr.; Warren Comstock

(57) ABSTRACT

A brake booster (12) having a housing (18) with an interior separated into a front chamber (26) and a rear chamber (28) by a wall (30) retained on a peripheral surface (106) of a cylindrical body (34) of a hub (32). The cylindrical body (34) is characterized by having a radial flange (100) that extends from a first end (44), a ledge (102) located adjacent the radial flange (100), an annular shoulder (104) that extends from the peripheral surface (106) and a groove (108) located between the ledge (102) and shoulder (104). The groove (108) has a depth (d) adjacent the shoulder (104) that is approximately equal to the height (h) of the shoulder (104) above the peripheral surface (106) and a side wall (110) that transitions from the groove (108) into the ledge (102). The wall (30) is characterized by a metal disc (38) having an axial flange (202) that extends from a first end (204) into an annular slot (218) in a diaphragm (36) to define a lip (40). The lip (40) is located on the ledge (102) and a portion of the axial flange (202) is deformed into the groove (108) such that an axial seal (300) is created between lip the (40) and flange (100) to prevent communication from the front chamber (26) to the rear chamber (28) along the peripheral surface (106) of the cylindrical body (34).

9 Claims, 2 Drawing Sheets

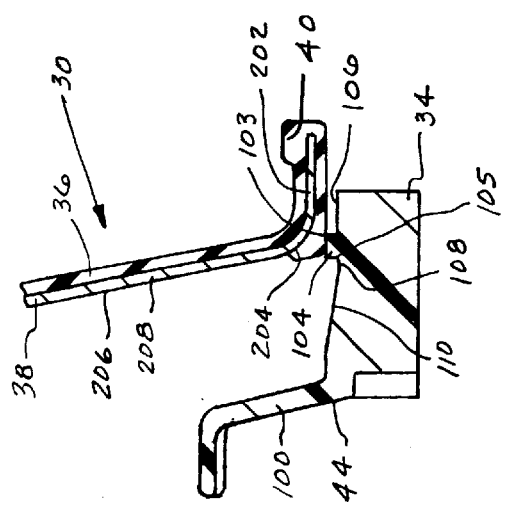
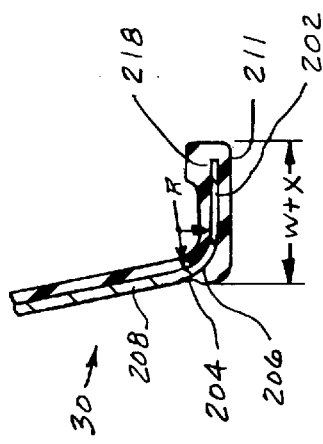
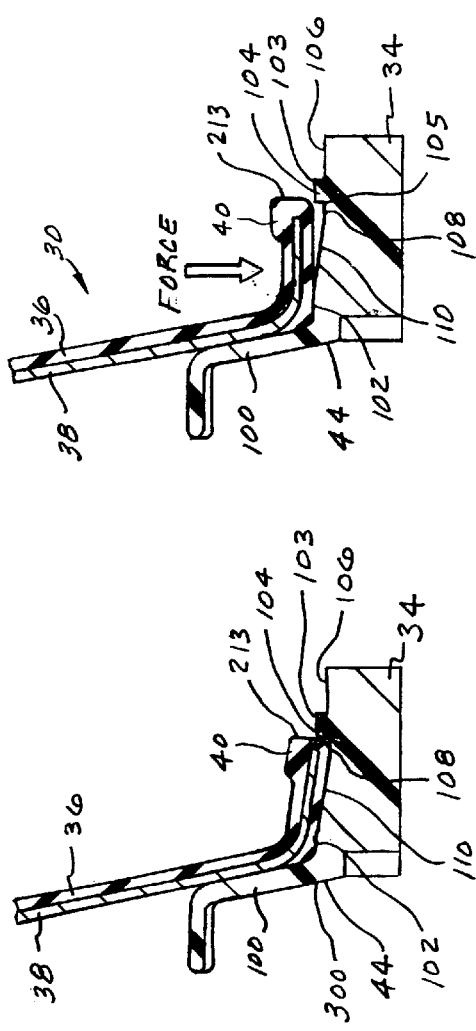
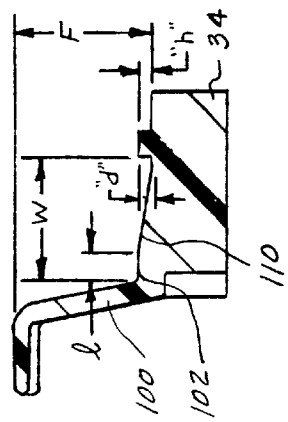
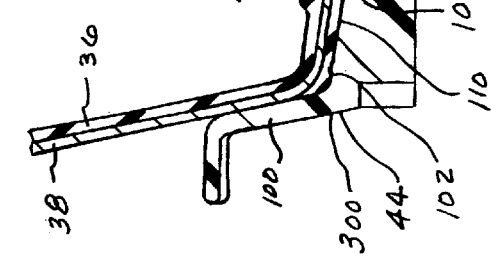

BRAKE BOOSTER

This invention relates to a brake booster and the way a wall is attached to a hub to separate the interior housing of the brake booster into a front chamber and a rear chamber.

BACKGROUND OF THE INVENTION

In vacuum brake boosters it is common for a movable wall to separate the interior of a housing into a front chamber and a rear chamber. Initial the movable wall was defined by a piston moving in a bore with a seal carried on the peripheral surface to seal the front chamber from the rear chamber. In an effort to reduce the resistance to movement of the piston, the seal was replaced by a rolling diaphragm such as disclosed in U.S. Pat. No. 3,279,327. In a further effort simplify a brake booster, the diaphragm was modified as disclosed in U.S. Pat. No. 5,207,142 by placing the diaphragm on the peripheral surface of the movable wall. However, in such vacuum brake boosters, the movable wall needed to be reinforced in order to transmit the operational force developed by a pressure differential acting thereon to the output push rod. It is therefor more common to provide the diaphragm with a metal backing plate through which the output force is transmitted into a hub for transmission to the output rod. In this type vacuum brake booster, a first bead on the rolling diaphragm is retained between flanges on front and rear shells that define the housing of the vacuum brake booster while a second bead is located in a groove on the movable wall. In an effort to provide for a common control valve for a vacuum brake booster, it was disclosed that a wall using a same cylindrical member could accommodate various sizes in a vacuum booster by changing the diameter of a backing plate and diaphragm as disclosed in U.S. Pat. No. 3,958,497. These vacuum brake boosters, as disclosed in the prior art, operate in a satisfactory manner, however, during assembly some specialized tools may be required to secure the movable wall to the hub for the control valve.

SUMMARY OF THE INVENTION

In the present invention a brake booster includes a wall for separating an interior of a housing into a front chamber and a rear chamber is attached to a cylindrical body of a hub through a deformation of an axial flange on a backing plate into a groove to hold a lip on a diaphragm in a sealing relationship with a flange on the cylindrical body.

According to this invention, the brake booster has a housing defined by joining a first shell with a second shell. The interior of the housing is separated into at least a first chamber and a second chamber by a wall. The wall a diaphragm with an interior lip connected to a peripheral surface on a cylindrical body of a hub and an exterior lip retained between flanges on the first and second shells. The cylindrical body has an axial bore that extends from a first end to a second end to retain a control valve. The control valve is designed to sequentially connect the first chamber with the second chamber in a first mode of operation and the second chamber to the environment in a second mode of operation. In the first mode of operation the fluid pressure between the first and second chambers is equal while in the second mode of operation, air presented to the second chamber, creates a pressure differential across the wall in response to an operational force being applied by an operator to initiate a brake application. The pressure differential acts on the wall to develop an output force that is communicated into the hub and after overcoming a return spring, the output force moves the hub to provide pistons in a master cylinder with an operational input force to effect a brake application. The cylindrical body of the hub is characterized by a radial flange that extends from the first end, a ledge that is located adjacent the flange, annular shoulder that extends from the peripheral surface and a groove located between the ledge and the annular shoulder. The groove has a depth adjacent the shoulder that is approximately equal to the height of the shoulder above the peripheral surface and a side wall that transitions from the groove to the ledge. The wall is characterized by a metal disc with an axial flange that extends from a first end and a diaphragm. The diaphragm has a lip with an annular slot therein that receives the axial flange on the metal disc. The lip is located on the ledge and a portion of the axial flange is deformed into the groove such that an axial seal is defined between the lip and the flange to prevent communication from the first chamber to the second chamber along the peripheral surface of the cylindrical body.

An advantage of this invention resides in a method through which a backing plate and diaphragm are attached to define a wall for a brake booster.

An object of this invention is to provide a vacuum brake booster with a wall attached to a hub by deforming a portion of an axial flange against a shoulder to develop an axial seal.

BRIEF DESCRIPTION OF THE DRAWINGS

FIG. 2a is an enlarged sectional view of a portion of the flange on the cylindrical body of FIG. 1;

FIG. 2b is an enlarged sectional view of a portion of the lip defined by the diaphragm and metal disc of the wall in FIG. 1;

FIG. 3 is an enlarged view of a portion of the wall and the cylindrical body during an initial step in the attachment of the wall to the hub of FIG. 1;

FIG. 4 is an enlarged view of a portion of the wall and the cylindrical body during an intermediate step in the attachment of the wall to the hub of FIG. 1; and FIG. 5 is an enlarged view of a portion of the wall and the cylindrical body during a final step in the attachment of the wall to the hub of FIG. 1.

DETAILED DESCRIPTION

Figure 1:
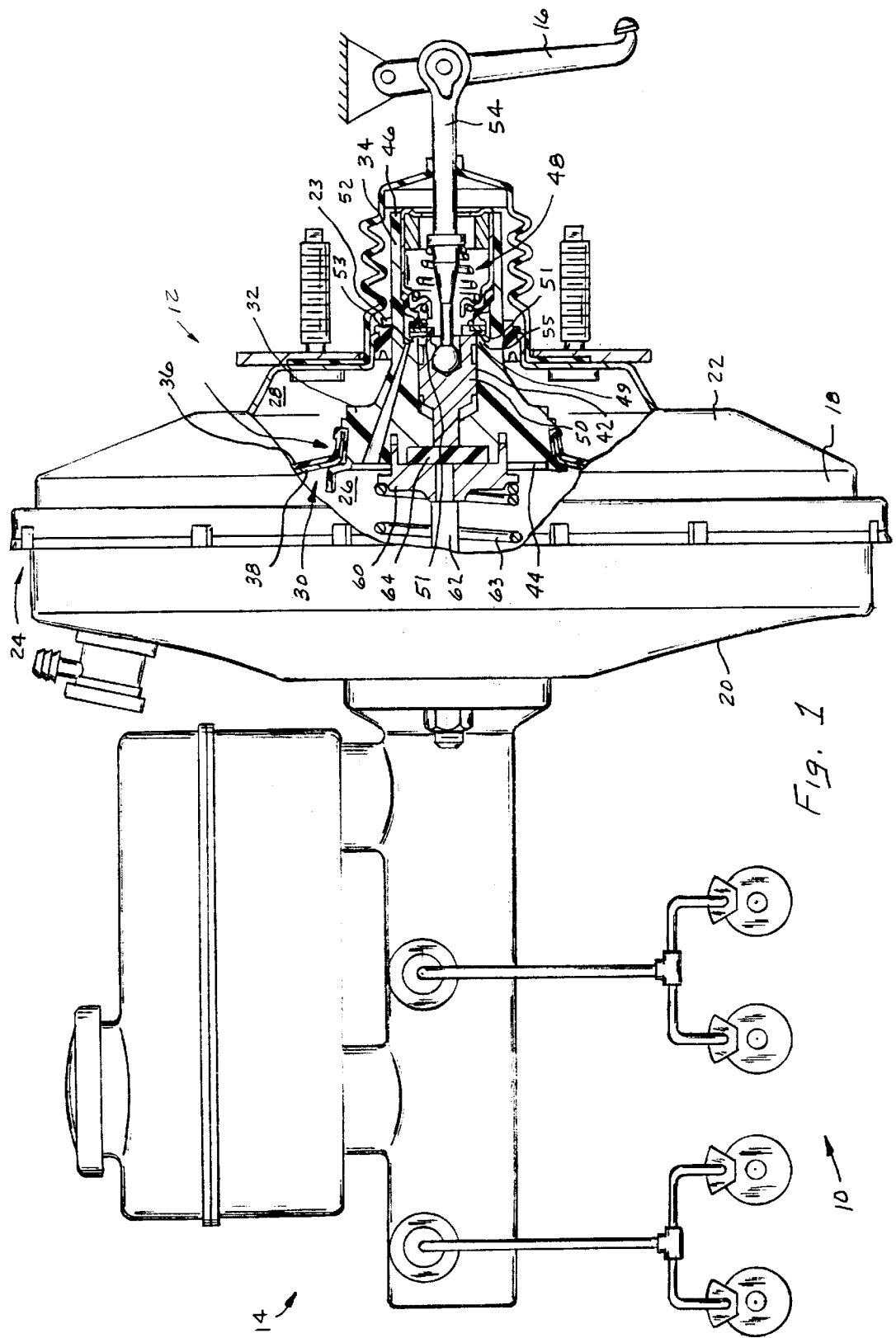
FIG. 1 is schematic illustration of a brake system with a sectional view of vacuum brake booster having a wall attached to cylindrical body of a hub according to the teachings of the present invention.

The brake system 10 as shown in FIG. 1 includes a vacuum brake booster 12, made according to the present invention, for supplying a master cylinder 14 with an operational force to pressurized fluid to effect a brake application in response to an input force applied to a brake pedal 16.

The brake booster is of general type, such as disclosed in U.S. Pat. No. 3,958,497, having a housing 18 defined by a front shell 20 that is joined to a rear shell 22 by a locking arrangement 24. The interior of the housing 18 is divided into a front chamber 26 and a rear chamber 28 by a movable wall 30. The movable wall 30 is defined by a hub member 32 having a cylindrical body 34 with a metal backing plate 34 and diaphragm 36 attached thereto. The diaphragm 36 has a peripheral lip (not shown) that is held by the locking arrangement 24 and an internal lip 40 that engages the peripheral surface on the cylindrical body 34 to seal the front chamber 26 from the rear chamber 28. The hub member 32 as defined by the cylindrical body 34 has an axial bore 42 that extends from a first end 44 to a second end 46. The second end 46 extends through an opening 23 in the rear shell 22 such that air from the surrounding environment is communicated to bore 42. A control valve 48 that includes a plunger 50 and poppet member 52 is located in the axial bore 42. The plunger 50 of the control valve 48 is connected to brake pedal 16 by a push rod 54. In a first mode of operation, the control valve 48 is in a stationary position as illustrated in FIG. 1 whereby the front chamber 26 is connected to the rear chamber 28 such that a same fluid pressure (vacuum) in the front chamber 26 is also present in the rear chamber. Axial bore 42 in hub member 32 receives a head 60 on an output push rod 62 to position a reaction disc 64 adjacent plunger 50. The output push rod 62 extends through an opening in the front shell 20 and is connected to pistons in the master cylinder 14. In response to an input force applied to brake pedal 16, the plunger 50 and poppet member 52 of the control valve 42 move such that poppet engages a first seat 53 to terminate communication between the front chamber 26 and the rear chamber 28 and thereafter the plunger 50 moves away from a second seat 51 to allow air from the environment to enter the rear chamber 28 and develop a pressure differential across the movable wall 30. The pressure differential acts on the movable wall 30 and is communicated through the reaction disc 64 to the head 60 of the output push rod 62 to supply pistons in master cylinder 14 with an operational force to pressurize fluid in the master cylinder 14 that is thereafter supplied to the wheel brakes to effect a brake application. In order for the optimum pressure differential to developed across the movable wall 30 is important that the front chamber 26 is sealed from the rear chamber 28 by the diaphragm 36 such that the communication between the front chamber 26 and rear chamber 28 and the rear chamber 28 and the surrounding environment is controlled by the control valve 48.

The separation of the front chamber 26 from the rear chamber 28 is achieved by present invention through the relationship between the hub member 32 and movable wall 30.

In more particular detail, the hub member 32, as best illustrated in FIG. 2a, is characterized by cylindrical body 34 having a radial flange 100 that extends a radial distance "F" above the peripheral surface 106 at the first end 44, a ledge 102 located adjacent the flange 100, an annular shoulder 104 that extends from peripheral surface 106 and a groove 108 located between the ledge 102 and shoulder 104. The groove 108 has a depth "d" adjacent shoulder 104 that is approximately equal to the height "h" of the shoulder 104 above peripheral surface 106 and a side wall 110 that transitions from the bottom 105 of the groove at shoulder 104 to ledge 102. The ledge 102 and the top 103 of the shoulder 104 have a substantially same height "h" above the peripheral surface 106 while the width "l" of ledge 102 is approximately equal to the thickness of the movable wall 30. The shoulder 104 is located a distance from the radial flange 100 at a width "w".

The movable wall 30, as best illustrated in FIG. 2b, is characterized in that metal disc 38 has a flat surface 208 with an axial flange 202 that extends from a first end 204 and in that lip 40 of diaphragm 36 has a slot 218 for receiving the axial flange 202. The metal disc 38 has a uniform annular section 206 that transition from a flat surface 208 into the axial flange 202. The uniform annular section 206 is defined by a radius "R" that is approximately length equal to the width "l" of ledge 102. The base 211 of lip 40 has a width that is equal to the width "w" between shoulder 104 and radial flange 100 plus a length "x" such that its width is defined as "w+x".

Method of Assembly

In the manufacture of brake booster 12, the movable wall 30 is assembled as a separate component prior to the insertion into the rear shell 22. A hub 34 of a type illustrated in FIG. 2a and having a cylindrical body 34 with a radial flange 100 on a first end 44, a ledge 102 adjacent the radial flange 100, a shoulder 104 separated from the flange 102 by a groove 108 is selected from a source. Thereafter, a movable wall 30 of a type illustrated in FIG. 2a and defined by a metal disc 38 with an axial flange 202 located in a slot 218 of a lip 40 is selected from a source. The movable wall 30 is placed on the second end 46 of cylindrical body 34 and moved toward the radial flange 100 as illustrated in FIG. 3, such that the base 211 of lip 40 slides over the top 105 of shoulder 104 and onto ledge 102 with out resistance or interference. An axial force is now applied to compress lip 40 against the radial flange 100 such that width "w+x" of the lip 40 now equals the width "w" between radial flange 100 and shoulder 104 as illustrated in FIG. 4. The compression of the lip 40 creates an axial seal 300 between the lip 40 and radial flange 100. Thereafter, a plurality of radial forces "F" are applied to deform the axial flange 202 such that a portion thereof is moved into groove 108 to bring end 213 into engagement with shoulder 104 to retain the movable wall 30 on the cylindrical body 34, see FIG. 5. The deformation of the axial flange 202 into groove 108 is designed to occur at the tangent of the radius R and as a result the axial seal 300 is not effected by the deformation. In some instances it may be easier to roll a portion of the axial flange 202 into groove 108 rather than only be deformed at a plurality of locations around the circumference of the axial flange 202 but either method of retention is acceptable as shoulder 104 defines a stop such that lip 40 is resiliently retained against radial flange 100. The remainder of the assembly of the brake booster 12 is conventional in that the control valve 48 is thereafter located in axial bore 42 of hub 34, and the hub is thereafter placed in the rear shell 22 such that the second end 46 passes through opening 23 in the rear 22 and the outer lip of diaphragm 36 placed on a peripheral flange on the real shell 22. The reaction disc 64 and output push rod 60 are placed in the axial bore 42 of the hub 34 and return spring 63 located between the movable wall 30 and front shell 20. A compressive force is applied to move the front shell 20 and rear shell 22 together to retain the lip on the movable wall 30 there between and the front shell 20 and rear shell 22 thereafter joined together through a locking arrangement 24 to complete the assembly of brake booster 12.

Mode of Operation

The vacuum brake booster 12 for brake system 10 is illustrated in FIG. 1 in a position of rest. For an operator to effect a brake application to reduce the speed or stop a vehicle, an input force is applied to brake pedal 16 that moves push rod 54 in a linear manner to operate control valve 48 by moving plunger 50. Initial movement of the plunger 50 allows a spring to seat face 51 on poppet member 52 on vacuum seat 53 on the cylindrical body 34 to interrupt communication between the front chamber 28 and rear chamber 28. Thereafter further movement of plunger 50 moves face 49 away from atmospheric seat 55 to allow air to enter the rear chamber 28 and establish a pressure differential across movable wall 30 with vacuum present in the front chamber 26. With air in the rear chamber 28 and vacuum in the front chamber 26, the pressure differential created across wall 30 produces an output force that is transmitted into hub 50 by way of movable wall 30 acting on the radial flange 100. The output force is carried through the reaction disc 64 and into head 60 and once the force of return spring 63 is overcome, an operational force is transmitted through output put rod 62 to move pistons in the master cylinder 12 and develop pressurized fluid that is communicated to wheel brakes in the vehicle to effect a brake application. Once a brake application has been completed to the satisfaction of an operator and the input force applied to brake pedal 16 is removed, return spring 63 acts on hub member 32 to move the movable wall 30 to the position of rest shown in FIG. 1 with the front chamber 26 again connected to the rear chamber 28 and the fluid pressures therein equalized.

In the vacuum brake booster 12 shown in FIG. 1, the output force developed by the pressure differential to the hub member 32 is applied over substantially the entire area defined by the height of the flange 100 as the flat surface 208 of the metal disc 38 essentially engages the entire surface area of the flange 100 while the axial seal 300 is maintained by the engagement of the lip 40 with shoulder 104.

We claim:

1. A brake booster comprising:

a housing with an interior separated into at least a first chamber and a second chamber by a wall connected to a peripheral surface on a cylindrical body of a hub, said cylindrical body having axial bore that extends from a first end to a second end for retaining a control valve that sequentially connects said first chamber with said second chamber to provide for the equalization of fluid pressure between said first and second chambers during a first mode of operation and interrupting communication between said first and second chambers while connecting said second chamber to a surrounding environment to allow air to enter into said second chamber and create a pressure differential across said wall in response to an operational signal to defining a second mode of operation, said pressure differential acting on said wall to develop an output force that is communicated to said hub and after overcoming a return spring moves an output push rod to provide a master cylinder with an operational input to effect a brake application, said cylindrical body being characterized by:
a radial flange that extends from said first end;
a ledge located adjacent said radial flange;
an annular shoulder that extends from said peripheral surface; and
a groove located between the ledge and shoulder, said groove having a depth adjacent said shoulder that is approximately equal to the height of the shoulder above said peripheral surface, said groove having a side wall that transitions from said shoulder to said ledge; and
said wall being characterized by:
a metal disc with an axial flange that extends from a first end and a diaphragm, said diaphragm having a lip with an annular slot therein for receiving said axial flange of said metal disc, said lip being located and retained on said ledge by a portion of said axial flange being deformed into said groove such that an axial seal is defined between said lip and said flange to prevent communication from said first chamber to said second chamber along the peripheral surface of said cylindrical body.

2. The brake booster as recited in claim 1 wherein said metal disc is further characterized by a uniform annular transition that joins said axial flange to a flat surface; and in that said axial flange engages said shoulder to retain said lip against said flange to define said axial seal.

3. The brake booster as recited in claim 2 wherein said cylindrical body is further characterized by said ledge and shoulder having a substantially same height above said peripheral surface such that said lip may be moved past said shoulder and onto said ledge without interference.

4. The brake booster as recited in claim 2 wherein said uniform annular transition is characterized by having a radius approximately equal to a width of said ledge such that substantially no deformation occurs in the annular transition when said axial flange is deformed into said groove.

5. The brake booster as recited in claim 1 wherein said shoulder is characterized by being located on said cylindrical body a first distance from said radial flange to define a first width; and in that said lip is characterized by a second width, said second width being greater that said first width such that on said lip being located on said ledge and said axial flange is deformed into said groove and said lip is axially compressed such that said second width is equal to said first width.

6. In a brake booster comprising:

a housing with an interior separated into at least a first chamber and a second chamber by a wall connected to a hub, said hub having a cylindrical body with an axial bore therein that extends from a first end to a second end;

a control valve located in said axial bore for sequentially connecting said first chamber with said second chamber to provide for the equalization of fluid pressure there between in a first mode of operation and interrupting communication between said first and second chambers while connecting said second chamber to a surrounding environment to allow air to enter into said second chamber and create a pressure differential across said wall in response to an operational signal to define a second mode of operation, said pressure differential acting on said wall to develop an output force that is communicated through said hub to an output push rod, said output force, after overcoming a return spring, moving said output push rod to provide a master cylinder with an operational input to effect a brake application, said cylindrical body being characterized by;
a radial flange that extends from said first end, a ledge adjacent said radial flange;
an annular shoulder separated from said ledge by a groove, said groove having a side wall that transitions into said ledge; and said wall being characterized by:
a metal disc with an axial flange that extends from a first end and a diaphragm, said diaphragm having a lip with an annular slot for receiving said axial flange of said metal disc, said lip being located on said ledge and said axial flange is deformed into said groove such that an axial seal is defined between said lip and said flange to prevent communication from said first chamber to said second chamber along the peripheral surface of said cylindrical member.

7. The brake booster as recited in claim 6 wherein said metal disc is further characterized by a transitional section located between said axial flange and a flat radial surface on said metal disc, said flat radial surface being substantially parallel with said radial flange on said cylindrical body such that said output force is uniformly transmitted through said radial surface into said radial flange for moving said hub.

8. The brake booster as recited in claim 7 wherein said transitional section is characterized by a radius having a length that is equal to the width of said ledge such that said transitional section is not effected by the deformation of said axial flange into said groove.

9. The brake booster as recited in claim 8 wherein said lip is characterized by having an axial length that is greater that a length between said radial flange and said shoulder on said cylindrical body such that on deformation of said axial flange into said groove said lip is compressed to a length that is substantially equal to said first length in creating said axial seal.

* * * * *